(12) United States Patent
Madhavan

(10) Patent No.: US 8,825,752 B1
(45) Date of Patent: Sep. 2, 2014

(54) SYSTEMS AND METHODS FOR PROVIDING INTELLIGENT AUTOMATED SUPPORT CAPABLE OF SELF REJUVENATION WITH RESPECT TO STORAGE SYSTEMS

(75) Inventor: Sreejith Madhavan, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 122 days.

(21) Appl. No.: 13/475,608

(22) Filed: May 18, 2012

(51) Int. Cl.
*G06F 11/00* (2006.01)
*G06F 12/16* (2006.01)

(52) U.S. Cl.
USPC ........... 709/203; 709/224; 709/200; 709/223; 726/22; 726/23; 726/24; 726/25; 714/18; 714/25; 714/27; 714/16

(58) Field of Classification Search
CPC ...................................................... G06F 11/00
USPC .......... 709/203, 223–228; 726/22, 23, 24, 25; 714/15–18, 25, 27, 37–39, 47–50
See application file for complete search history.

(56) References Cited

U.S. PATENT DOCUMENTS

| | | | |
|---|---|---|---|
| 6,629,266 B1 * | 9/2003 | Harper et al. | 714/38.1 |
| 7,158,926 B2 * | 1/2007 | Kampe | 703/22 |
| 7,734,778 B2 * | 6/2010 | Tsao | 709/225 |
| 8,443,232 B1 * | 5/2013 | Nagineni et al. | 714/13 |
| 2003/0055915 A1 * | 3/2003 | Ngo | 709/219 |
| 2003/0079154 A1 * | 4/2003 | Park et al. | 714/1 |
| 2003/0154244 A1 * | 8/2003 | Zellers et al. | 709/203 |
| 2010/0268827 A1 * | 10/2010 | Sheets et al. | 709/226 |

* cited by examiner

Primary Examiner — Jude Jean Gilles
(74) Attorney, Agent, or Firm — LeClairRyan, a Professional Corporation

(57) ABSTRACT

Systems and methods which provide an intelligent automated support (IASUP) architecture in which logic is implemented to control support messaging in an automatic, timely, and meaningful fashion to imbibe intelligent automated support functionality are disclosed. Embodiments of an IASUP architecture implement bidirectional communication links between storage systems and IASUP back-end systems providing data collection. The bidirectional communication links supported by IASUP architectures of embodiments facilitate automated storage system rejuvenation functionality whereby an IASUP back-end system provides processing and analysis with respect to storage system data to initiate manipulation or control of one or more components of a storage system.

27 Claims, 5 Drawing Sheets

SYSTEMS AND METHODS FOR PROVIDING INTELLIGENT AUTOMATED SUPPORT CAPABLE OF SELF REJUVENATION WITH RESPECT TO STORAGE SYSTEMS

TECHNICAL FIELD

The invention is directed generally to operation and management of storage systems and, more particularly, to providing intelligent automated support with respect to storage systems.

BACKGROUND OF THE INVENTION

The creation and storage of digitized data has proliferated in recent years. Accordingly, various storage systems that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes. Accordingly, in such a cluster network environment various cluster and node components interact to provide storage services to clients.

As can be appreciated from the foregoing, storage systems may comprise relatively complex infrastructure implementing a plurality of components which interact to provide desired storage services. Accordingly, various tools have been developed for use in managing and/or monitoring such storage systems.

For example, a storage administrator may utilize an application, such as may be executed on a management console of the storage system, to interact with the storage system and components thereof to provide report generation, configuration, and control. Representative examples of such management applications include DFM OPERATIONS MANAGER available from NetApp, Inc. and STORAGE ESSENTIALS available from Hewlett-Packard Company. Although providing useful front-end (e.g., service or user side) reporting and control interfaces, such management applications are essentially user interfaces which allow a storage administrator or other user to obtain information regarding the operation of the storage system and to directly manipulate or change various settings as desired. Management applications available today do not facilitate back-end (e.g., infrastructure or manufacturer side) automated support capabilities.

As another example of a tool developed for use in managing and/or monitoring storage systems, back-end automated support (ASUP) functionality, such as NETAPP AUTOMATED SUPPORT available from NetApp, Inc., has been implemented with respect to some storage systems. Such ASUP functionality traditionally provides a call-home type automated support system in which a storage system issues messages as a monitored event occurs. The messages typically include raw (i.e., natively available within the monitored system, without analysis, aggregation, etc.) information from the monitored system regarding the particular monitored event. Such messages are provided in a unidirectional communication link (i.e., outbound only from the storage system) to an ASUP back-end system (e.g., ASUP back-end server) where the data is collected in a flat file. Back-end support personnel, such as support representatives of the equipment manufacturer or infrastructure provider, may access the collected data and determine that one or more actions should be taken with respect to the storage system. Accordingly, the existing ASUP functionality provides a support framework in which reactive action may be taken by support personnel in response to their proactive use of the ASUP support system tool.

The foregoing ASUP functionality, although providing a useful tool for assisting in the monitoring and management of a storage system, can suffer from several disadvantages. For example, the relatively simple call-home messaging implementation of such ASUP architectures can result in message flooding (e.g., essentially provide a denial of service attack on the ASUP back-end system when certain anomalies associated with a monitored event persist (e.g., a monitored event is repeatedly detected until action is taken to correct the anomaly). Moreover, the sheer volume of data collected by the ASUP back-end system (e.g., ASUP records including complete logs, events, and counter information from every ASUP-enabled field system) presents challenges with respect to support personnel parsing through the data to identify actual operational problems and failures, particularly where a large number of benign event messages are produced. Even where it is determined that one or more actions should be taken with respect to the storage system, current ASUP functionality does not itself enable taking responsive action. This is generally so for at least two reasons. Separate tools, such as the aforementioned management applications, provide the only interface for initiating change within the storage system. Moreover, security and other operational concerns usually mandate that changes to the storage system be tightly controlled. Thus, allowing back-end initiated manipulation of the storage system or components thereof, without being at the direction or under control of the front-end system, is generally not acceptable to the users or operators of the storage system. Accordingly, back-end support personnel must typically work with front-end management personnel in order to direct the manipulation of system changes, such as through storage administrator use of a management application, where it is determined that one or more actions should be taken with respect to the storage system.

BRIEF SUMMARY OF THE INVENTION

The present invention is directed to systems and methods which provide an intelligent automated support (IASUP) architecture in which logic is implemented to control support messaging in an automatic, timely, and meaningful fashion to imbibe intelligent automated support functionality. Embodiments of an IASUP architecture herein implement bidirectional communication links between storage systems and IASUP back-end systems providing data collection. The bidirectional communication links of embodiments of the invention facilitate IASUP messaging on-demand of the IASUP back-end systems at the initiation of and under control of the storage system. Accordingly, intelligent controls may be placed upon the messaging from storage systems, to thereby facilitate collection of useful data while avoiding issues such as flooding and redundant messages, without compromising the security and autonomous control of the front-end system.

The bidirectional communication links supported by IASUP architectures of embodiments herein facilitate functionality in addition to the foregoing intelligent support messaging. For example, automated storage system rejuvenation functionality may be implemented by embodiments of the invention. An IASUP back-end system may, for example, provide processing and analysis with respect to storage system data (e.g., as provided by the intelligent support messaging from the storage system) to initiate manipulation or control of one or more components of a storage system (e.g., as provided by intelligent support messaging from the IASUP back-end system) to provide rejuvenation functionality. Because the bidirectional communication links of embodiments are at the initiation of and under control of the storage system, the storage system continues to retain autonomous control with respect to any attempts by an IASUP back-end system to make changes thereto. Accordingly, embodiments of the invention move beyond the reactive nature of existing ASUP functionality and provide intelligent support systems which may be operable to provide predictive, preventative, and preemptive support functionality.

In providing an IASUP architecture according to embodiments of the invention, one or more IASUP client modules may be provided for operation in the storage system environment. For example, where the storage system comprises a cluster environment IASUP client modules may be provided with respect to each of a plurality of cluster nodes for facilitating intelligent support messaging herein. An IASUP back-end system may comprise a corresponding IASUP server also for facilitating the intelligent support messaging. An IASUP back-end system of embodiments further includes an IASUP back-end server for collecting and analyzing the data provided by the support messages from the support system and to generate support messages for providing to the storage system to implement rejuvenation functionality. A rules ecosystem of the IASUP back-end system may be provided for use in intelligent operation of the aforementioned IASUP server and IASUP back-end server.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
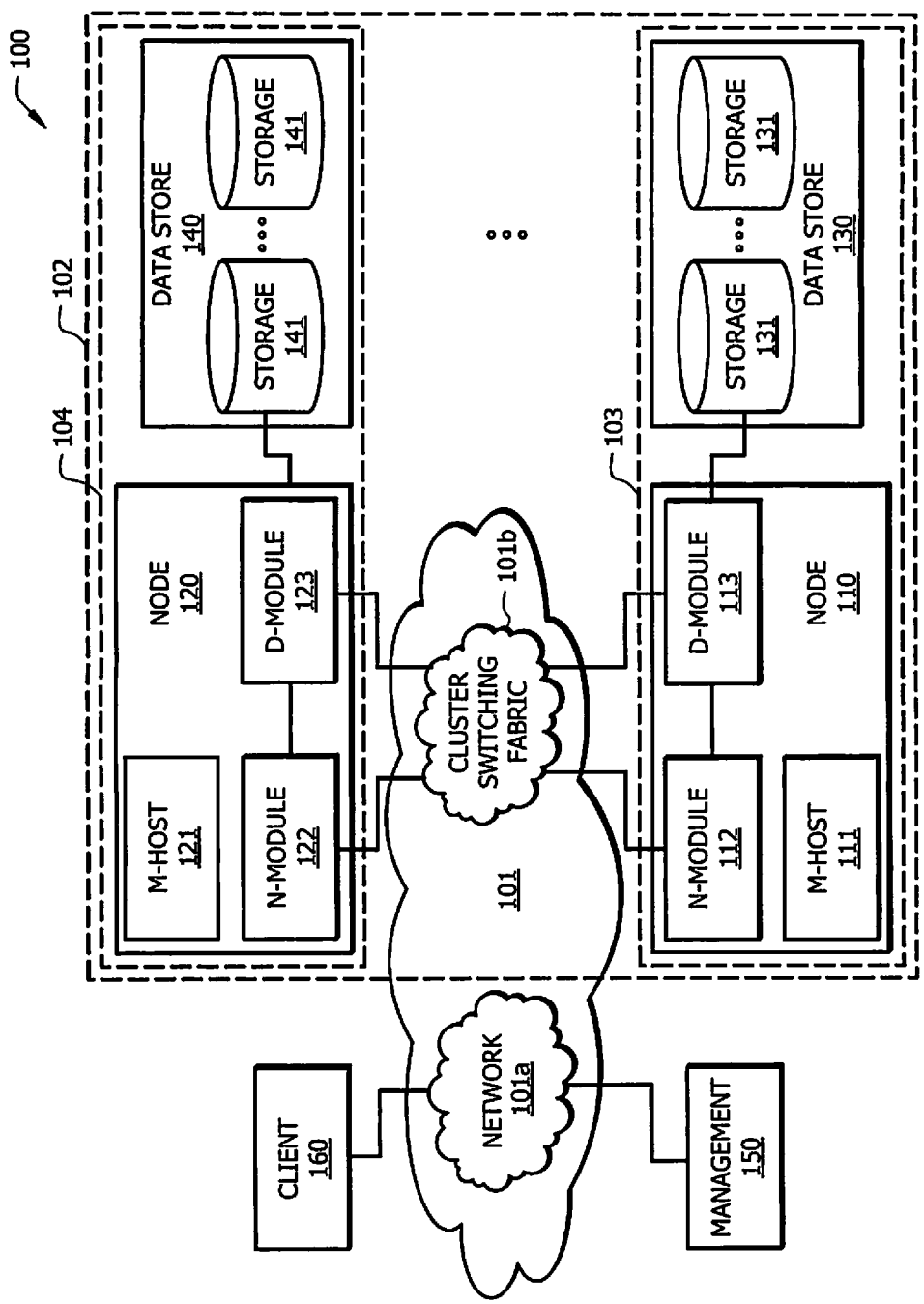
FIG. 1 shows a block diagram of a system adapted according to embodiments of the invention to provide intelligent automated support.

FIG. 1 shows a block diagram of a system adapted according to embodiments of the invention to provide intelligent automated support herein. System 100 of FIG. 1 comprises an exemplary clustered network environment in which storage system 102 includes data storage sub-systems 103 and 104 coupled via network 101. Data storage sub-systems 103 and 104 of embodiments may comprise one or more modules, components, etc. operable to provide operation as described herein. For example, data storage sub-systems 103 and 104 of the illustrated embodiment comprise nodes 110 and 120 and data store devices 130 and 140, respectively. It should be appreciated that nodes and/or data store devices of data storage sub-systems 103 and 104 may themselves comprise one or more modules, components, etc. Nodes 110 and 120 of the illustrated embodiment comprise management elements (also referred to herein as "M-Hosts") 111 and 121, network modules (also referred to herein as "N-Modules") 112 and 122, and data modules (also referred to herein as "D-Modules") 113 and 123, respectively. Data store devices 130 and 140 of the illustrated embodiment comprise one or more storage media 131 and 141 (e.g., hard disk drives, solid state drives, optical disks, flash memory, etc.) operable to store user and/or other data, respectively.

The modules, components, etc. of data storage sub-systems 103 and 104 may comprise various configurations suitable for providing operation as described herein. For example, nodes 110 and 120 may comprise processor-based systems, such as file server systems, computer appliances, computer workstations, etc. Accordingly, nodes 110 and 120 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Data store devices 130 and 140 may, for example, comprise disk memory, flash memory, optical memory, and/or other suitable computer readable media and associated circuitry (e.g., interfaces, controllers, decoders, etc.). Data modules 113 and 123 of nodes 110 and 120 may be adapted to communicate with data store devices 130 and 140 according to a storage area network (SAN) protocol (e.g., small computer system interface (SCSI), fiber channel protocol (FCP), INFINIBAND, etc.) and thus data store devices 130 and 140 may appear as a locally attached resources to the operating system. That is, as seen from an operating system on nodes 110 and 120, data store devices 130 and 140 may appear as locally attached to the operating system. In this manner, nodes 110 and 120 may access data blocks of storage media 131 and 141 through the operating system, rather than expressly requesting abstract files.

Network modules 112 and 122 may be configured to allow nodes 110 and 120 to connect with various systems, such as management system 150 and/or client system 160, over network connections provided by network 101 to allow such systems to access data stored in data storage sub-systems 103 and 104 and/or to otherwise provide communication with respect to other components of storage system 102. Moreover, network modules 112 and 122 may provide connections with one or more other components of system 100, such as through network 101. For example, network module 122 of node 120 may access data store device 130 via communication via network 101 and data module 113 of node 103. The foregoing operation provides a distributed storage system configuration for system 100.

System 100 of the illustrated embodiment includes one or more client systems, represented here as client 160, for which access to and/or communication with storage system 102 is provided. For example, data storage services may be provided to one or more such clients by storage system 102. Accordingly, applications operable upon client 160 may interact with components of storage system 102 via network 101 to store data, access data, manage data, etc. It should be appreciated that, although referred to as clients, such client systems may comprise systems traditionally thought of as client systems (e.g., termination points for the data stored by data store devices 130 and 140) as well as systems traditionally thought of as server systems (e.g., systems providing data handling and/or management services to other systems).

System 100 may further include one or more management systems, represented here as management system 150, for providing management services with respect to storage system 102. Management system 150 may, for instance, communicate with nodes 110 and 120 across network 101 to control performance of various operations and to request information from or provide information to the nodes. In addition, management system 150 may be configured to receive inputs from and provide outputs to a user of system 100 (e.g., storage administrator) thereby operating as a centralized management interface between the administrator and system 100. It should be appreciated that, although management system 150 is illustrated as a single functional block, management system 150 of embodiments may comprise a number of systems, components, etc., such as a plurality of servers providing functionality as described herein.

Systems of embodiments provided access to and otherwise provide communication with storage system 102, such as management system 150 and client 160, comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein. Although the systems of the illustrated embodiment provide communication with components of storage system 102 via network 101, it should be appreciated that other embodiments of the present invention may employ different means of providing the requisite communication with respect to client systems and/or management systems herein.

Network 101 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. It should be appreciated that network 101 may comprise various forms, and even separate portions, of network infrastructure. For example, nodes 110 and 120 may be interconnected by cluster switching fabric 101b while nodes 110 and 120 may be interconnected to other systems, such as management system 150 and/or client system 160, by a more general data network (e.g., the Internet, a LAN, etc.).

As can be appreciated from the foregoing, system 100 provides a data storage system in which various digital data may be created, maintained, modified, and accessed (referred to collectively as data management). A logical mapping scheme providing logical data block mapping information, stored within and stored without the data structures, may be utilized by system 100 in providing such data management. For example, a filesystem implemented by data store devices 130 and 140 may implement a logical data block allocation technique. In an exemplary configuration of system 100, client 160 can utilize storage system 102 to store and retrieve data from volumes maintained by the filesystem implemented by data store devices 130 and 140. In such an embodiment, for example, client 160 can send data packets to N-module 122 in node 120 within data storage sub-system 104. Node 120 can forward the data to data store device 140 using D-module 123, where data store device 140 comprises the volume being accessed by client 160. In this way, in this example, the client can access the storage to store and/or retrieve data, using data storage sub-system 104 connected by network 101. Further, in this embodiment, client 160 can exchange data with N-module 112 in node 110 within data storage sub-system 103 (e.g., which may be remote from data storage sub-system 104). Node 110 can forward the data to data storage device 130 using D-module 113, thereby accessing one or more volumes associated with the data storage device 130.

The foregoing data store devices each comprise a plurality of data blocks, according to embodiments herein, which may be used to provide various logical and/or physical storage containers, such as files, container files holding volumes, aggregates, virtual disks, etc. Such logical and physical storage containers may be defined using an array of blocks indexed or mapped either logically or physically by the filesystem using the appropriate type of block number. For example, a file may be indexed by file block numbers (FBNs), a container file by virtual block numbers (VBNs), an aggregate by physical block numbers (PBNs), and disks by disk block numbers (DBNs). To translate an FBN to a disk block, a filesystem (e.g., a write anywhere file layout (WAFL) filesystem) may use several steps, such as to translate the FBN to a VBN, to translate the VBN to a PBN, and then to translate the PBN to a DBN. Storage containers of various attributes may be defined and utilized using such logical and physical mapping techniques. For example, the aforementioned volumes may be defined to comprise aggregates (e.g., a traditional volume) and/or flexible volumes (e.g., volumes built on top of traditional volumes as a form of virtualization) using such logical and physical data block mapping techniques.

Figure 2:
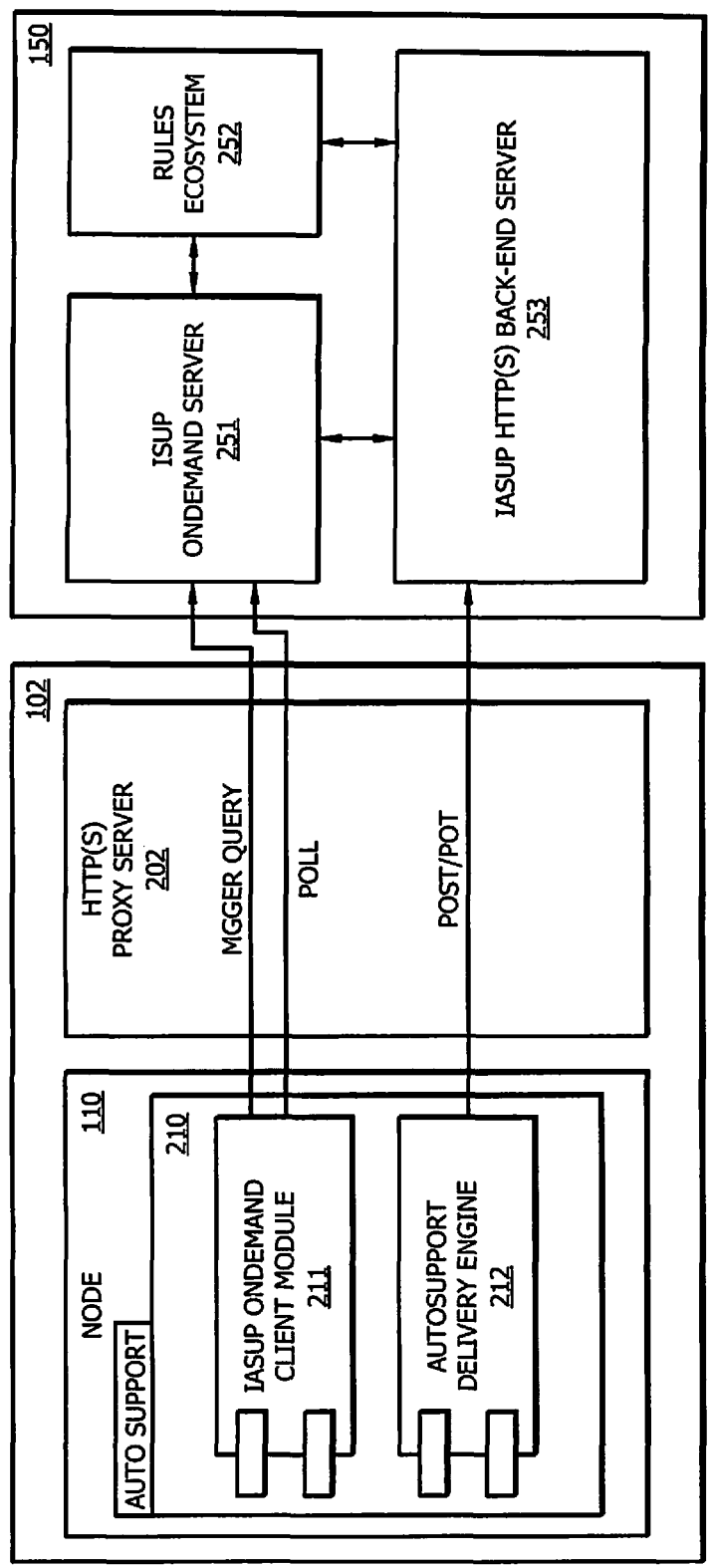
FIG. 2 shows particular adaptations made with respect to the system of FIG. 1 to implement an IASUP architecture according to embodiments of the invention.

FIG. 2 shows particular adaptations made with respect to system 100 of FIG. 1 to implement an IASUP architecture according to embodiments of the invention. As can be seen in FIG. 2, the illustrated embodiment of management system 150 comprises IASUP server 251, rules ecosystem 252, and IASUP back-end server 253 cooperative to facilitate intelligent automated support functionality herein.

IASUP server 251 of embodiments includes one or more processes for receiving automated support messages, saving automated support messages, parsing automated support messages, loading automated support messages to a database (e.g., a database of IASUP back-end server 253), and enabling searching and data access with respect to the information of the automated support messages. As will be better understood from the discussion which follows, IASUP server 251 facilitates intelligent control of support messaging from one or more storage systems, including control to prevent flooding, undesired redundant messages, initiate retransmission of support messages that could not be previously delivered to the IASUP back-end system, etc. Additionally, IASUP server 251 of embodiments facilitates intelligent control of support messaging to one or more storage systems, including control to provide a request for support messages that could not be previously delivered to the IASUP back-end system, control changes to components of one or more storage systems, etc.

IASUP back-end server 253 of embodiments provides storage of storage system data, as provided by the support messages. Additionally, IASUP back-end server 253 facilitates analysis and manipulation of the information of the automated support messages (e.g., under control of IASUP server 251) for use in providing intelligent automated support functionality.

Rules ecosystem 252 of embodiments provides a central rules knowledge base repository establishing action and reaction events, thresholds, parameters, etc. For example, rules ecosystem 252 of embodiments includes one or more processes for implementing a rules engine receiving and managing control parameters used in defining an automated support rules base and for applying those rules to provide control determinations and to direct operations, thereby providing an ecosystem in which rules are defined, managed and applied. Control provided by IASUP server 251 may be as a function of analysis of data stored by IASUP back-end server 253 using one or more rules of rules ecosystem 252.

As can further be seen in FIG. 2, the illustrated embodiment of node 110 of storage system 102 comprises automated support front-end 210 which includes IASUP client module 211 and automated support delivery engine 212. As will be better understood from the discussion which follows, IASUP client module 211 of embodiments operates to control bidirectional communication with management system 150 (e.g., IASUP server 251) for implementing intelligent automated support functionality herein. In operation according to embodiments herein, communications between IASUP client module 211 and IASUP server 251 are controlled by IASUP client module 211, whether intelligent support messaging is being provided by IASUP client module 211 or is being provided by IASUP server 251, through the use of a query and poll protocol (i.e., IASUP server 251 is enabled to transmit messages to IASUP client module 211 only in response to query or poll from IASUP client module 211). Where such communications indicate that storage system data is to be reported to management system 150, automated support delivery engine 212 may provide transmission of one or more responsive support messages containing the data to management system 150 (e.g., to IASUP back-end server 253), such as under control of IASUP client module 211 and/or other control functionality (e.g., a management framework implemented in the storage system). Additionally or alternatively, IASUP client module 211 and/or other control functionality of the storage system may initiate control with respect to one or more components of storage system 102 in response to the aforementioned messages transmitted by IASUP 251, such as to provide automated storage system rejuvenation functionality (e.g., self diagnosis, self healing, self managed and auto configured entities, self learning, planned and controlled resource and load management, etc.) responsive to analysis performed by management system 150.

It should be appreciated that, although only node 110 is shown in FIG. 2 having automated support front-end 210 cooperating with management system 150 to facilitate intelligent automated support functionality herein, multiple instances of such functionality may be provided in the storage environment of storage system 102. For example, each storage sub-system node (e.g., each of nodes 110 and 120) of storage system 102 may be provided with an instance of automated support front-end 210 (e.g., IASUP client module 211 and automated support delivery engine 212, as well as additional or alternative functionality adapted to provide functionality as described herein).

The embodiment illustrated in FIG. 2 includes optional proxy server 202. Proxy server 202 of embodiments provides optional functionality for facilitating the aforementioned communications between the intelligent automated support functionality implemented in the front-end storage system environment and the intelligent automated support functionality implemented in the back-end management system environment. For example, IASUP client module 211 and/or automated support delivery engine 110 may be provided within the operating system kernel of node 110 and thus have limited resources available to them, be in an operating environment where consumption of processing cycles has an appreciable impact upon performance, etc. Accordingly, IASUP client module 211 and automated support delivery engine 212 may implement relatively simple message generation and forwarding functionality, and proxy server 202 of embodiments may provide the additional communication functionality to provide the intelligent support messaging herein. Accordingly, it should be appreciated that although embodiments may be described with reference to IASUP client module 211 and automated support delivery engine 212 providing intelligent support messaging herein, alternative embodiments may utilize a configuration in which proxy server 202 operates cooperatively with IASUP client module 211 and/or automated support delivery engine 212 to provide the intelligent support messaging.

Figure 3:
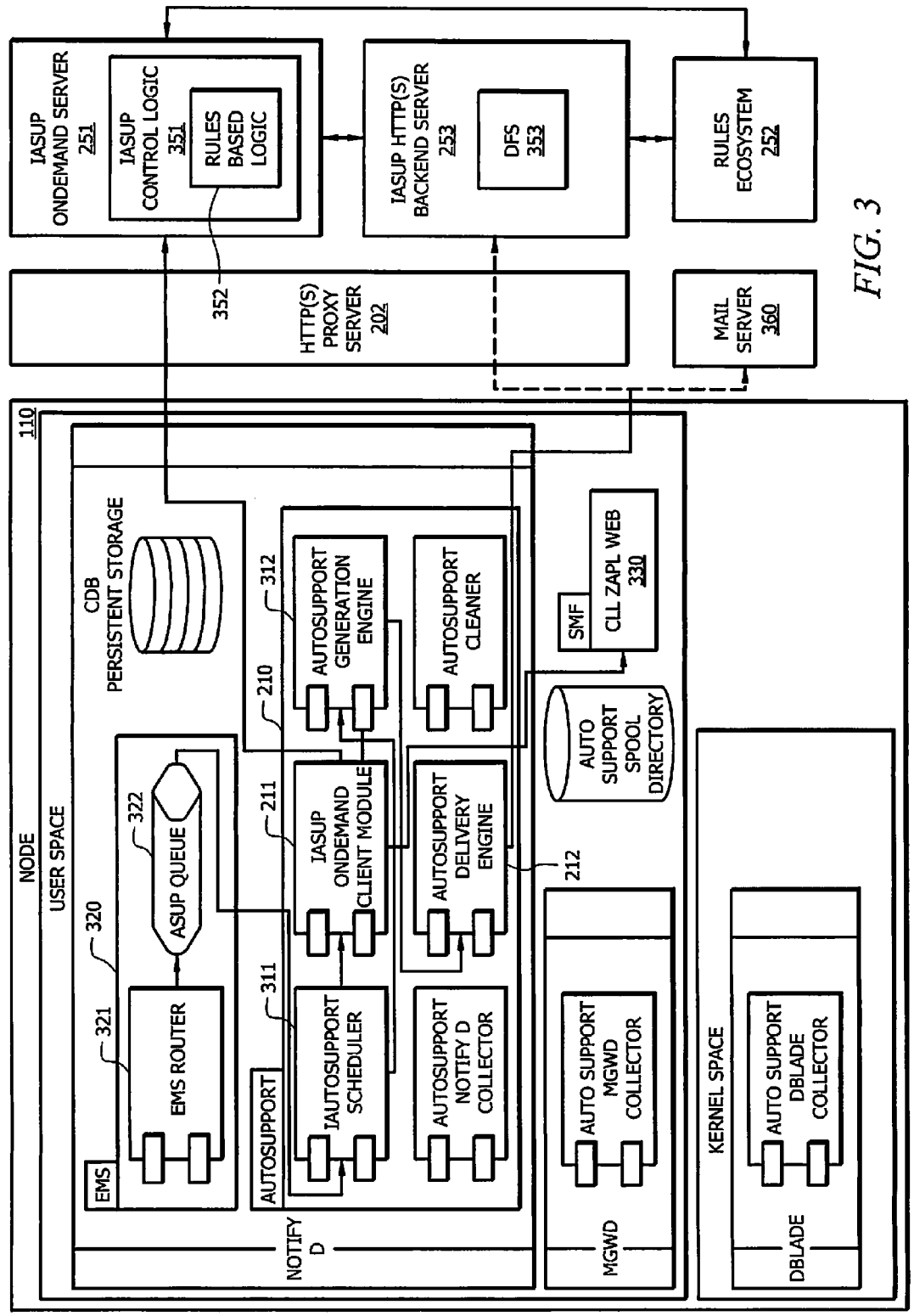
FIG. 3 shows additional detail with respect to intelligent automated support functionality of the IASUP architecture of FIG. 2 according to embodiments of the invention.

Having described intelligent automated support functionality of embodiments herein at a high level with reference to FIG. 2, attention is directed to FIG. 3 wherein additional detail with respect to intelligent automated support functionality of embodiments is provided. It should be appreciated that the embodiment illustrated in FIG. 3 provides but one example of functional blocks operable to provide intelligent automated support functionality. The concepts of the present invention are not limited to the configuration shown.

As shown in the embodiment illustrated in FIG. 3, one or more event messaging services (EMSs) may be provided with respect to a storage system (e.g., an EMS may be provided in each of nodes 103 and 104 of FIG. 1). In particular, EMS 320 is shown disposed in node 110 in association with automated support front-end 210. EMS 320 of embodiments operates to capture and queue event messages generated in response to monitored storage system events (e.g., error events, threshold events, failure events, warning events, etc.). For example, EMS 320 may monitor operation of one or more components and/or functionality of storage sub-system 103 associated with node 110 and generate event messages, such as may include raw data available to EMS 320 associated with the event, in accordance with event parameters as may be established by a storage administrator and/or management system. The event parameters for identifying an event may comprise identification of particular events, identification of particular errors, device operational thresholds, etc. The raw data of the event message may comprise information such as an event identifier (e.g., event name), a set of attributes characterizing that event's context, corrective action information, identification of a storage device or other component experiencing the event, a time stamp for the event, version information regarding the storage system and/or its components, etc. EMS router 321 may route the generated EMS messages, or some subset thereof, to ASUP queue 322 for use in intelligent support messaging herein. Accordingly, ASUP queue 322 is shown to be in communication with automated support front-end 210.

The embodiment of automated support front-end 210 illustrated in FIG. 3 includes automated support scheduler 311 cooperative with IASUP client module 211 to provide controlled, intelligent communication of support messages by the storage system. In operation according to an embodiment, as further described below, automated support scheduler 311 notifies IASUP client module 211 of new event messages in ASUP queue 322. IASUP client module 211 of embodiments in turn establishes communication (e.g., using a trigger query of the aforementioned query and poll protocol) with IASUP server 251 for intelligent control with respect to the message (e.g., control determination provided IASUP control logic 351). Depending upon a response from IASUP server 251, IASUP client module 211 may provide control to automated support front-end 210 such that the particular event message does not result in a support message transmitted to IASUP back-end server 253 (e.g., IASUP server 251 may determine that the event message is associated with an already know event and is thus redundant, that the message is associated with a benign event and thus the data contained therein is not needed, that more critical processing is taking place and thus the message is not desired at this time, etc.) or does result in a support message transmitted to IASUP back-end server 253. If it is determined that intelligent support messaging is to be provided with respect to the event message, IASUP client module 211 may control automated support scheduler 311 to deliver the event message to automated support generation engine 312. Support generation engine 312 may thus generate a support message including the raw data of the event message, and perhaps additional data (e.g., appended data may be provided to provide a more data rich message, wherein such appended data may comprise system identification, message identification (e.g. sequence number, generated time stamp, etc.) providing an indication that this is a re-transmission of the message, one or more files containing configuration information and/or logs from the sending system, etc.,). The support message generated by automated support generation engine 312 is provided to automated support delivery engine 212 for transmission to IASUP back-end server 253 and/or mail server 360 of the illustrated embodiment.

It should be appreciated that the embodiment of FIG. 3 provides for communication of support messages from the storage system to IASUP back-end server 253 and/or mail server 360. Support messages provided to IASUP back-end server 253 may be stored for historical analysis, analyzed for use in providing rejuvenating functionality, compiled for reporting, etc. Support messages provided to mail server 360 may be communicated to one or more interested parties (e.g., back-end support personnel, front-end storage administrator personnel, users, etc.) and/or systems (e.g., other management systems, data aggregators, other support tools, etc.). Control as to the intended recipient of such support messages may be provided by IASUP client module 211 (e.g., based upon the type of event triggering generation of the EMS message, based upon particular information contained within the message, based upon the response provided by IASUP server 251 in response to the trigger query, etc.).

IASUP back-end server 253 of the embodiment illustrated in FIG. 3 implements distributed file system (DFS) 353 for use in storing and utilizing the data of the intelligent automated support functionality. DFS 353 preferably comprises a software framework that supports data-intensive applications, allowing such applications to parse, analyze, and access large amounts of data (e.g, terabytes and even petabytes of data) efficiently and effectively. For example, DFS 353 of embodiments may comprise a Hadoop distributed file system (HDFS). For example, the HDFS provides a software framework, derived from the Google File System (GFS), that supports data-intensive distributed applications which enables applications to work with thousands of computational independent computers and petabytes of data. Irrespective of the particular DFS employed, rather than utilizing a simple flat file message repository of prior ASUP back-end systems, IASUP back-end server 253 of the embodiment illustrated in FIG. 3 is adapted to enable robust data mining and user access.

Correspondingly, IASUP server 251 illustrated in FIG. 3 comprises IASUP control logic 351, having rules based logic 352 therein, operable to facilitate intelligent automated support functionality using the data stored by DFS 353. For example, in addition to the aforementioned control determination provided IASUP control logic 351 used in determining if a particular support message is to be transmitted by a storage system, IASUP control logic 351 of embodiments is operable to access, analyze, and mine the storage system data stored by DFS 353 as may be used in providing rejuvenating control (e.g., self diagnosis, self healing, self managed and auto configured entities, self learning, planned and controlled resource and load management, etc.) with respect to the storage system. Rules based logic 352 of IASUP control logic 351 may interface with rules ecosystem 252 to provide rules based analysis of the storage system data and/or rules based determinations regarding the particular rejuvenating control to be provided in response to the analysis.

Rules ecosystem 252 of embodiments comprises rules creation and management tools for facilitating creating and managing rules applied by rules based logic 352 to provide intelligent automated support functionality. For example, a storage manager may utilize a web-based interface of rules ecosystem 252 to provide control parameters used in defining an automated support rules base and for defining rules for application in controlling intelligent automated support functionality. Accordingly, rules ecosystem 252 may be provided with one or more sets of proactive support rules to be executed on automated support message data. Such rule sets may contain different domains of rules from the organization (e.g., customer relationship management (CRM) customer database rules, case generation rules, at-risk system rules, proactive support rules primarily driven through automated support messages, etc.). The rules may define the pattern to be detected in automated support message sections and create actions subsequently to effect a recommendation for the particular instance of rule, if applicable. By way of example, a rule may check the automated support messages for any user volumes exceeding a threshold of 80% used capacity and, if detected, raise an alert of "volume space full" for the respective volume and system. As another example, a rule may analyze operation of the storage system and/or components thereof (e.g., storage media) to predict one or more hot spots (i.e., areas of heavy usage) on the System (e.g., hot volumes, hot interfaces, etc.) which are occurring and/or which may occur at a given point in time in the future. Such a rule may define suitable corrective action to be administered, such as by injecting smart a message to "move" the hot spot or distribute the load on the emerging hot spot. Accordingly, rules ecosystem 252 of embodiments comprises a rules runtime which providing one or more interfaces for rule execution (e.g., by rules based logic 352 of IASUP server 251) and registering data providers (e.g., IASUP back-end server 253). For example, the software framework implemented by DFS 353 supporting data-intensive applications facilitates the robust data mining associated with operation of IASUP control logic 351 to provide such access and analysis and the resulting rejuvenating control (e.g., self diagnosis, self healing, self managed and auto configured entities, self learning, planned and controlled resource and load management, etc.) with respect to the storage system.

Rejuvenating control may be provided by intelligent support messaging from IASUP server 251 to IASUP client module 211. For example, after having received one or more support messages from automated support front-end 210 and/or other automated support front-ends of storage system 102, IASUP control logic 351 of IASUP server 251, preferably using rules based logic 352 and rules ecosystem 252, may determine that some form of rejuvenating control is desired with respect to one or more components of storage system 102.

It should be appreciated that IASUP back-end server 253 of embodiments implementing a distributed file system (e.g., DFS 353) may comprise a HDFS, is capable of processing and serving huge amount of data provided in highly complex patterns spanning years of automated support data collection, such as automated support logs, performance counters, etc, to serve one or more sets of rules (e.g., defined based on use cases as described herein). IASUP back-end server 253 of embodiments may thus provide intelligent and timely data to rules ecosystem 252, where the rules are applied (e.g., in runtime) and the results are stored within one or more action databases of rules ecosystem 252. Responsive to a poll by an IASUP client module, IASUP server 251 may query the action/recommendation database of rules ecosystem 252 (e.g., by operation of rules based logic 352) and serve the recommended rejuvenating control commands and/or configuration settings back to the respective storage system.

Accordingly, in response to a poll communication (as discussed below) from IASUP client module 211, IASUP server 251 may provide a support message having one or more rejuvenating control commands suitable for configuring or reconfiguration an operational aspect to storage system 102. IASUP client module 211 of the respective storage system may further process and apply the rejuvenating control commands and/or configuration settings of the support message. Receipt of such a support message by IASUP 211 may thus be utilized to implement the desired change, such as by IASUP client module 211 providing the control message to logic of IASUP client module 211 to be translated to node specific commands (e.g., command-line interpreter command) or application programming interface (API) calls to update the relevant simple management framework (SMF) tables of SMF 330 of the illustrated embodiment. SMF 330 of embodiments provides a software framework providing one or more predefined tables (e.g., predefined by the developers as they introduce features into the sub-systems) holding the appropriate configuration and operational control information for the corresponding sub-systems. The updated SMF tables of SMF 330 may be replicated to the sub-systems within the node and/or other nodes of the storage system to take effect.

As can be appreciated from the foregoing, the intelligent automated support architecture of embodiments facilitates bidirectional communication links supporting intelligent support messaging in an automatic, timely, and meaningful fashion to imbibe intelligent automated support functionality. Using such functionality, embodiments of the invention provide intelligent support systems which may be operable to provide predictive, preventative, and preemptive support functionality. For example, IASUP control logic 351 may analyze data made available in a meaningful way by DFS 353 to identify trends and thus predict unsatisfactory operation of a storage system, such as through application of one or more rules of rules ecosystem 252, to thereby provide preventative or preemptive rejuvenating control with respect to components of the storage system.

It should be appreciated that the functional blocks, or portions thereof, providing the foregoing operation may be implemented in executable instructions (e.g., software and/or firmware) whereby elements of embodiments of the present invention are essentially code segments operable upon a processor-based or computer system (e.g., nodes 110 and 120, management system 150, and/or client 160) to perform tasks as described herein. Such program or code segments can be stored in a computer readable medium (e.g., RAM, ROM, disk memory, optical memory, flash memory, etc.).

Figure 4:
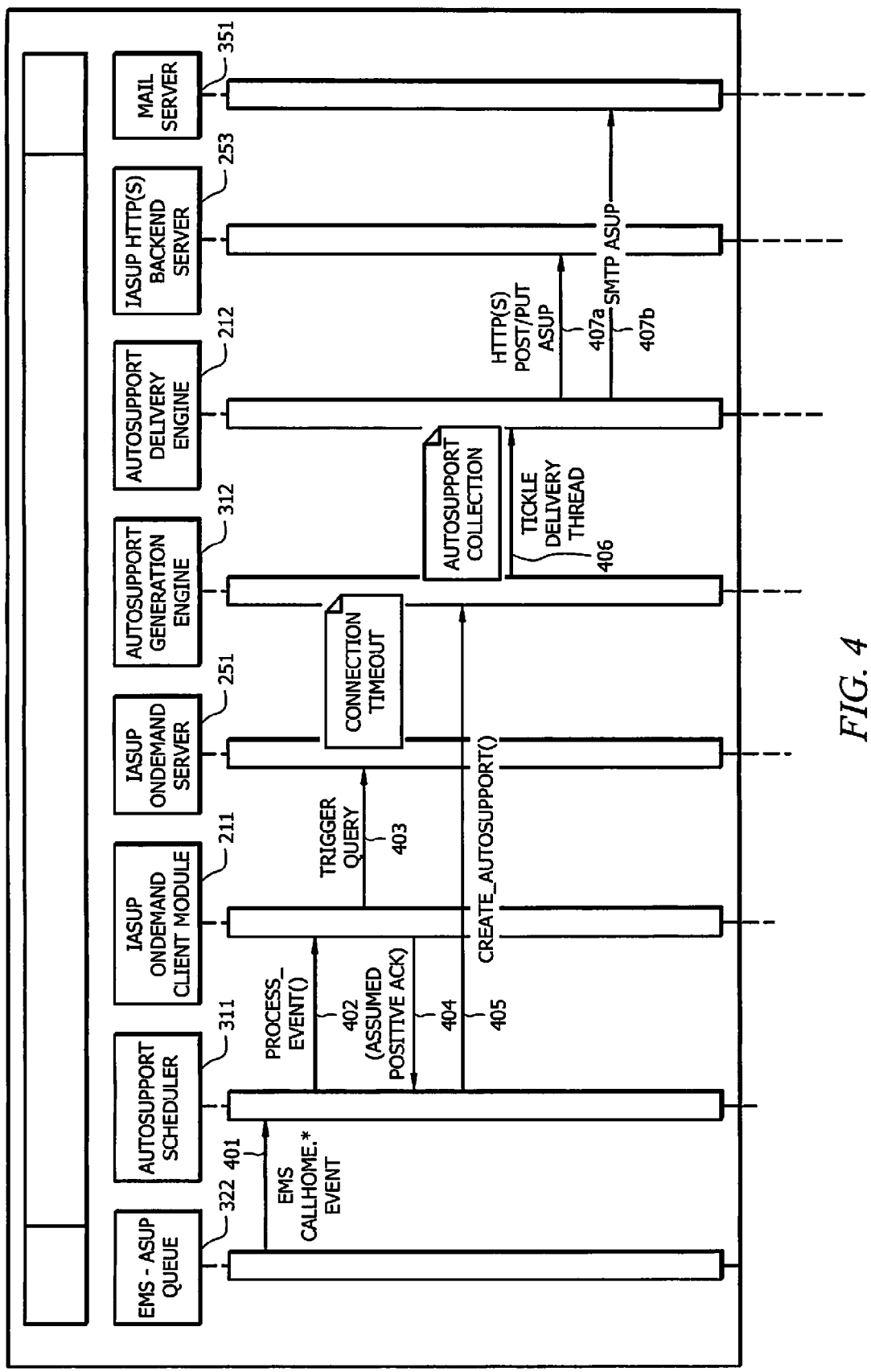
FIG. 4 shows a basic communication sequence to provide a trigger query according to embodiments of the invention.
Figure 5:
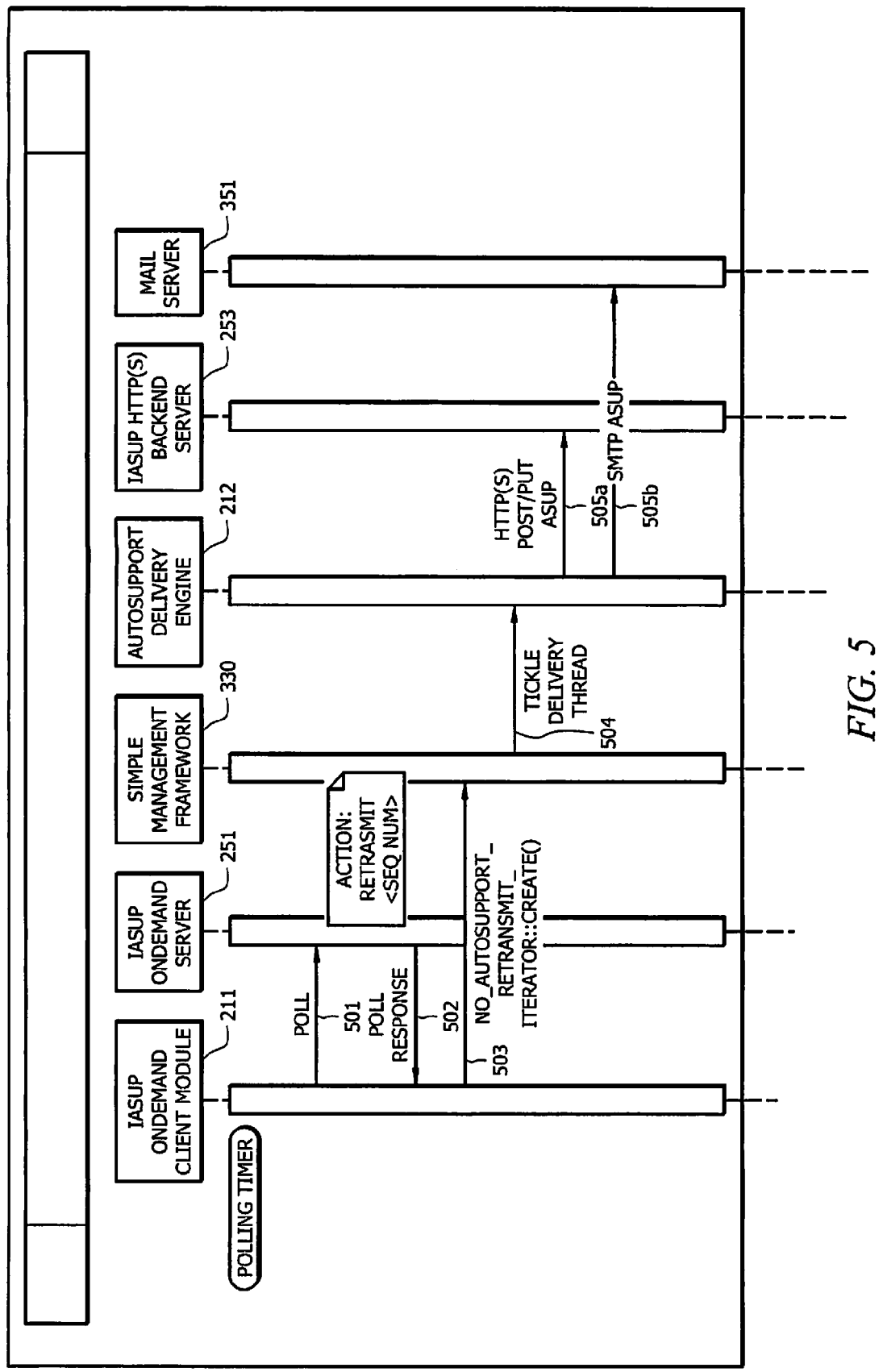
FIG. 5 shows a basic communication sequence to provide a poll according to embodiments of the invention.

Having described the IASUP architecture of embodiments of the invention, attention is directed to the ladder diagrams of FIGS. 4 and 5 wherein basic communication according to query and poll protocols used by embodiments of the invention is shown. Specifically, the ladder diagram of FIG. 4 shows a basic communication sequence to provide a trigger query of embodiments, such as may be used by an automated support front-end to initiate communications with a management system in response to a monitored event having been detected. The ladder diagram of FIG. 5 shows a basic communication sequence to provide a poll of embodiments, such as may be used by an automated support front-end to initiate periodic or aperiodic communications with a management system (e.g., in the absence of detection of a monitored event).

Referring now to FIG. 4, the trigger query communication sequence of the illustrated embodiment begins at epoch 401 wherein ASUP queue 322 enqueues an event message (e.g., a particular monitored event may be detected, a monitored parameter may be determined to have crossed a threshold, etc.). At epoch 402 automated support scheduler 311 detects the presence of the event message and initiates a process event function by IASUP client module 211. The communication between automated support scheduler 311 and IASUP client module 211 may include information regarding the event (e.g., a type of event, the time of the event, the component experiencing the event, etc., as may be included in the event message data). At epoch 403 IASUP client module 211 establishes communication with IASUP server 251 to provide a trigger query message thereto (e.g., a message querying IASUP server 251 as to whether a support message is to be provided with the event message data, wherein the query message may include some portion of the event message data or other data with which IASUP sever 251 may make a determination regarding the support message).

In the communication sequence illustrated in FIG. 4 it is assumed that IASUP server 251 determines that transmission of the support message is desired, accordingly at epoch 404 IASUP client module 211 provides a positive acknowledgement to automated support scheduler 311. In operation according to the illustrated embodiment, to reduce communication traffic associated with intelligent support messaging, a connection timeout without a negative acknowledgement from IASUP server 251 is interpreted to indicate a determination that the support message is desired. Of course, if IASUP server 251 made a determination that a support message is not desired, a negative acknowledgment may be transmitted by IASUP sever 251 to IASUP client module 211 and the trigger query communication sequence would correspondingly be ended without transmission of the support message.

Having received a positive acknowledgment from IASUP client module 211, at epoch 405 automated support scheduler 311 initiates a create support message function by automated support generation engine 312. The communication between automated support scheduler 311 and automated support generation engine 312 may include the event message and/or information regarding the event (e.g., a pointer to the particular event message for which a support message is to be generated). Having generated the support message, at epoch 406 automated support generation engine 312 initiates a delivery thread by automated support delivery engine 212, preferably providing the generated support message thereto. At epoch 407, automated support delivery engine 212 operates to transmit the support message to one or more intended recipients. For example, in response to control information provided by IASUP client module 211 and/or IASUP server 251, automated support delivery engine 212 may transmit the support message to IASUP back-end server 253 at epoch 407a. Additionally or alternatively, in response to control information provided by IASUP client module 211 and/or IASUP server 251, automated support delivery engine 212 may transmit the support message to mail server 351 at epoch 407b.

Referring now to FIG. 5, the poll communication sequence of the illustrated embodiment begins at epoch 501 wherein IASUP client module 211 initiates communication with IASUP server 251 to provide a poll message thereto. For example, upon expiration of a polling timer IASUP client module 211 may determine that communication with IASUP server 251 is to be established in order to determine if IASUP server 251 is in need of communication with automated support front-end 210, such as to request retransmission of data, to provide control messages to IASUP client module 211, etc.

In the communication sequence illustrated in FIG. 5 it is assumed that IASUP server 251 determines that providing a support message in response to the poll from IASUP client module 211 is desired, such as to request retransmission of a support message, to implement rejuvenating control with respect to storage system 102, etc., accordingly at epoch 502 IASUP server 251 provides a poll response (e.g., a support message, which includes control commands and/or other data for initiating desired operation, issued in response to the poll) to IASUP client module 211. In operation according to embodiments, to reduce communication traffic associated with intelligent support messaging, a connection timeout without a poll response from IASUP server 251 is interpreted to indicate no action by automated support front-end 210. If it is determined that no action by automated support front-end 210 is desired (e.g., no poll response is received by IASUP client module 211) the poll communication sequence may correspondingly be ended.

Having received a poll response from IASUP server 251, at epoch 503 IASUP client module 211 initiates a control thread by SMF 330. For example, IASUP server 251 may provide the poll response, or information contained therein, to SMF 330 for initiation of a control thread to achieve control of one or more components of storage system 102 in accordance with the poll response. It should be appreciated that the control thread initiated by SMF 330 may provide various functionality, such as to provide retransmission of a previous support message, reconfiguration of one or more components or aspects of storage system 102, etc. In the embodiment illustrated in FIG. 5, the control thread provides for retransmission of a support message (e.g., retransmission of a support message that could not be previously delivered to the IASUP back-end system). Accordingly, at epoch 504 SMF 330 provides control of automated support delivery engine 212 to provide retransmission of a selected support message. Of course, if a poll response providing for operation other than the retransmission of a support message is received, the control provided by SMF 330 would be altered from that of the illustrated embodiment to facilitate the desired functionality.

At epoch 505 of the illustrated embodiment, automated support delivery engine 212 operates to retransmit the support message to one or more intended recipients. For example, in response to control information provided by IASUP client module 211, IASUP server 251, and/or SMF 330, automated support delivery engine 212 may transmit the support message to IASUP back-end server 253 at epoch 505a. Additionally or alternatively, in response to control information provided by IASUP client module 211, IASUP server 251, and/or SMF 330, automated support delivery engine 212 may transmit the support message to mail server 351 at epoch 505b.

It should be appreciated that the foregoing basic communication sequences, and the responses provided thereto, may be utilized alone or in combination to facilitate intelligent automated support functionality, including automated storage system rejuvenation functionality, according to embodiments of the invention. For example, operation of the trigger query communication sequence of FIG. 4 may be utilized according to embodiments of the invention to populate one or more databases of IASUP back-end server 253 with data regarding the operation of components of storage system 102.

For example, in operation according to embodiments of the invention, the support messages received by management system 150 are persisted on DFS 353. Configuration information (config) provided by the support messages may be loaded into a low latency database, such as a scalable, distributed database that supports structured data storage for large tables (e.g., a HBase of Hadoop). The event log (EMS) and counter (CM) information provided by the support messages may be loaded into a database supporting ad hoc querying (e.g., a Hive database of Hadoop). Thus, the config, service, event log, and performance aspects of storage system 102 may be made available for querying, such as from systems of management system 150.

Rules ecosystem 252 provides an interface to define business rules. In operation, rules ecosystem 252 may source data from IASUP back-end server 253 amongst other data sources for use in defining rules, thresholds used by the rules, etc. The rules defined within rules ecosystem 252 help identify alerts and recommendations for the components of storage system 102 to provide desired operation.

This data may be accessed and analyzed by IASUP control logic 351, such as through application of rules of rules ecosystem 252 by rules based logic 352, to determine one or more actions that is to be taken with respect to storage system 102. For example, once the alerts and recommendations are available from the interaction between IASUP server 251, IASUP back-end server 253, and rules ecosystem 252, these can be pushed in a secure way back to IASUP client module 211. Operation of the poll communication sequence of FIG. 5, perhaps altered to implement control functionality in addition to or in the alternative to retransmission of a support message, may be utilized according to embodiments of the invention to initiate such automated storage system rejuvenation functionality with respect to storage system 102. Upon acceptance of these alerts and recommendations by IASUP client module 211, the components of storage system 102 are imbibing self healing, diagnosis and rejuvenation processes leading to intelligent automated support functionality.

The foregoing operation may be utilized in various ways and situations to provide useful intelligent automated support functionality herein. Use-cases that can be addressed automatically by the intelligent automated support functionality of embodiments of the invention include performance trending and fine-tuning of the storage system using CM statistics based trending analysis of the past support messages from the storage system nodes. The use-cases supported according to embodiments further include rules based event analysis, prediction of failures, and triggering corrective actions within the storage system, possibly spanning across components (e.g., clusters) having signature event matches in their support message event log payload. Another example of a use-case supported by embodiments herein includes initiation of automatic volume-move based on the hot volume (i.e., heavily used volume) detection on recent past trends. A further example of a use-case supported by embodiments of the invention includes initiation of auto upgrades on storage system components (e.g. cluster nodes), such as to provide firmware updates, release patches, etc. A use-case supported by embodiments herein provides improved logical interface (LIF) level load balancing and failover for the "busy" virtual servers of the storage system. Another use-case supported by embodiments of the invention facilitates best practice configurations, wherein configuration templates are matched against storage system component (e.g., cluster node) configuration settings and recommendations regarding the configuration settings made. It should be appreciated that use-cases supported according to embodiments herein provide customized monitoring, notification, and pre-emption opportunities heretofore not available with respect to automated support functionality. Moreover, use-cases supported herein provide for rejuvenation of the storage system by "learning" load (e.g., cpu, network, etc. load) and quality of service patterns from the event and performance counters and derive recommendations for self healing or balancing of the same across the storage system components (e.g., across a cluster entity). Such services provide a well managed, balanced and rejuvenated storage system and components thereof.

It should be appreciated that the event based, on demand support message data transfer provided by cooperative operation of the IASUP client module and IASUP server of embodiments herein provides a number of advantages over automated support techniques heretofore implemented. For example, partial or event based support messaging implemented according to the concepts herein provides for a lesser data footprint being transferred across the network. Moreover, intelligent support messaging control provided by the IASUP server of embodiments can streamline the inflow of support messages and thus reduce the backend load (i.e., by accepting or rejecting a support message trigger query from the IASUP client module). The IASUP server of embodiments can act as a back-end controller to orchestrate information rules based alert notification and recommendations to the storage system.

A distributed file system powered IASUP back-end server of embodiments facilitates data mining possibilities which are not possible with traditional NFS mounted ASUP repositories. Moreover, the highly distributed and scale-out nature of distributed file systems, such as the HDFS system, enables faster ingestion of incoming support messages (e.g., within 10 minutes of receiving a support message). Configuration data loaded into a distributed database that supports structured data storage for large tables, such as a HBase of Hadoop, is preferably provided in a highly scalable columnar shared-nothing database helping to retrieve the information in low latency times. Moreover, event logs (EMS) and counter data (CM-hourly-logs) provided by the support messages can be loaded into a database supporting ad hoc querying (e.g., a Hive database of Hadoop) enabling scanning, reporting and data-mining which was heretofore not possible. Accordingly, the config, event, and CM data from storage system components (e.g., cluster systems) may be retrieved and reported in reasonable time in response to business rules of the rules ecosystem. The foregoing provides operational convenience for the storage system support team in the way of lower support time and cost, particularly in the use-cases where the systems act/react autonomously.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing intelligent automated support for storage system self rejuvenation, the method comprising:
controlling transmission of support messages from a storage system with a management system operable to provide automated back-end support with respect to the storage system;
storing data of the support messages transmitted by the storage system in a distributed file system of the management system;
analyzing at least a portion of the data of the support messages stored by the distributed file system to determine a rejuvenating action to be taken with respect to one or more components of the storage system; and
transmitting a support message from the management system to a node of the storage system, the support message from the management system including information for automated initiation of the rejuvenating action by the storage system.

2. The method of claim 1, wherein the analyzing further comprising utilizing one or more rules of a rules ecosystem of the management system to determine the rejuvenating action.

3. The method of claim 1, wherein the analyzing further comprises providing a predictive determination with respect to operation of one or more components of the storage system.

4. The method of claim 3, wherein the rejuvenating action provides preemptive management of the one or more components.

5. The method of claim 1, wherein the rejuvenating action provides preventative action with respect to operation of one or more components of the storage system.

6. The method of claim 1, wherein the support messages from the storage system and the support message from the management system are transmitted via a bidirectional support messaging link.

7. The method of claim 6, wherein the support messages from the storage system are initiated across the bidirectional support messaging link in response to detection of an event within the storage system.

8. The method of claim 6, wherein the support messages from the storage system are initiated across the bidirectional support messaging link based on a polling period.

9. The method of claim 1, wherein the controlling transmission of support messages from the storage system comprises declining transmission of one or more of the support messages from the storage system to prevent message flooding at the management system.

10. A management system comprising:
a distributed file system and a processor coupled to a memory and configured to execute programmed instructions stored in the memory to perform steps comprising:
controlling transmission of support messages from a storage system;
storing data of the support messages transmitted by the storage system in the distributed file system;
analyzing at least a portion of the data of the support messages stored by the distributed file system to determine a rejuvenating action to be taken with respect to one or more components of the storage system; and
transmitting a support message to a node of the storage system, the support message transmitted to the node including information for automated initiation of the rejuvenating action by the storage system.

11. The system of claim 10, wherein the analyzing further comprises utilizing one or more rules of a rules ecosystem to determine the rejuvenating action.

12. The system of claim 10, wherein the analyzing further comprises providing a predictive determination with respect to operation of one or more components of the storage system.

13. The system of claim 12, wherein the rejuvenating action provides preemptive management of the one or more components.

14. The system of claim 10, wherein the rejuvenating action provides preventative action with respect to operation of one or more components of the storage system.

15. The system of claim 10, wherein the support messages from the storage system and the support message transmitted to the node are transmitted via a bidirectional support messaging link.

16. The system of claim 15, wherein the support messages from the storage system are initiated across the bidirectional support messaging link in response to detection of an event within the storage system.

17. The system of claim 15, wherein the support messages from the storage system are initiated across the bidirectional support messaging link based on a polling period.

18. The system of claim 10, wherein the controlling transmission of support messages from the storage system comprises declining transmission of one or more of the support messages from the storage system to prevent message flooding.

19. A non-transitory computer readable medium having stored thereon instructions for providing intelligent automated support for storage system self rejuvenation comprising machine executable code which when executed by a processor, causes the processor to perform steps comprising:
controlling transmission of support messages from a storage system;
storing data of the support messages transmitted by the storage system in a distributed file system;
analyzing at least a portion of the data of the support messages stored by the distributed file system to determine a rejuvenating action to be taken with respect to one or more components of the storage system; and
transmitting a support message to a node of the storage system, the support message transmitted to the node including information for automated initiation of the rejuvenating action by the storage system.

20. The medium of claim 19, wherein the analyzing further comprises utilizing one or more rules of a rules ecosystem to determine the rejuvenating action.

21. The medium of claim 19, wherein the analyzing further comprises providing a predictive determination with respect to operation of one or more components of the storage system.

22. The medium of claim 21, wherein the rejuvenating action provides preemptive management of the one or more components.

23. The medium of claim 19, wherein the rejuvenating action provides preventative action with respect to operation of one or more components of the storage system.

24. The medium of claim 19, wherein the support messages from the storage system and the support message transmitted to the node are transmitted via a bidirectional support messaging link.

25. The medium of claim 24, wherein the support messages from the storage system are initiated across the bidirectional support messaging link in response to detection of an event within the storage system.

26. The medium of claim 24, wherein the support messages from the storage system are initiated across the bidirectional support messaging link based on a polling period.

27. The medium of claim 19, wherein the controlling transmission of support messages from the storage system comprises declining transmission of one or more of the support messages from the storage system to prevent message flooding.

* * * * *